United States Patent
Chien et al.

(10) Patent No.: US 11,456,648 B2
(45) Date of Patent: Sep. 27, 2022

(54) ROTOR-GROUNDED MOTOR

(71) Applicant: Delta Electronics, Inc., Taoyuan (TW)

(72) Inventors: Han-En Chien, Taoyuan (TW);
Hung-Chi Chen, Taoyuan (TW);
Meng-Yu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 59 days.

(21) Appl. No.: 16/997,906

(22) Filed: Aug. 19, 2020

(65) Prior Publication Data

US 2021/0320568 A1 Oct. 14, 2021

(30) Foreign Application Priority Data

Apr. 10, 2020 (CN) .......................... 202010276543.1

(51) Int. Cl.
*H02K 11/40* (2016.01)
*H02K 5/15* (2006.01)
*H02K 5/16* (2006.01)
*H02K 11/33* (2016.01)

(52) U.S. Cl.
CPC ............... *H02K 11/40* (2016.01); *H02K 5/15* (2013.01); *H02K 5/161* (2013.01); *H02K 11/33* (2016.01)

(58) Field of Classification Search
CPC .......... H02K 11/40; H02K 11/33; H02K 5/15; H02K 5/161

USPC .......................................................... 310/67 r
See application file for complete search history.

(56) References Cited

U.S. PATENT DOCUMENTS

| 8,816,542 | B2* | 8/2014 | Kim | H02K 5/225 310/43 |
| 2012/0286608 | A1* | 11/2012 | Komiyama | F16C 33/6633 310/90 |
| 2015/0252507 | A1* | 9/2015 | Kim | D06F 17/08 68/23.6 |
| 2016/0315524 | A1* | 10/2016 | Ozaki | H02K 11/33 |
| 2018/0301961 | A1 | 10/2018 | Fukunaga | |
| 2021/0367486 | A1* | 11/2021 | Shim | H02K 13/105 |

FOREIGN PATENT DOCUMENTS

| EP | 2685611 B1 | 5/2016 | |
| EP | 3157141 A1 | 4/2017 | |
| KR | 100691916 B1 * | 3/2007 | H02K 3/50 |

* cited by examiner

*Primary Examiner* — Terrance L Kenerly
(74) *Attorney, Agent, or Firm* — Chun-Ming Shih; HDLS IPR Services

(57) ABSTRACT

A rotor-grounded motor including a stator, a rotor and a conductive plate. The stator is disposed with a bearing seat, and the bearing seat accommodates a bearing. The rotor includes a rotating shaft, and the rotating shaft is inserted in the bearing and electrically connected therewith. The conductive plate is disposed on the bearing seat, and one end of the conductive plate is connected to the bearing and the other end is electrically connected to a grounding terminal. The rotating shaft and the grounding terminal are electrically connected.

9 Claims, 10 Drawing Sheets

ROTOR-GROUNDED MOTOR

BACKGROUND OF THE INVENTION

Field of the Invention

The present invention relates generally to motors, and more particular, to a rotor-grounded motor.

Description of Related Art

The rotating shafts of current motors and generators often generate voltages, i.e. the shaft voltage, due to inductive coupling or capacitive coupling with motor winding. A leakage current to the rotating shaft is easily generated on a DC motor because of armature winding, and the leakage current generated by the shaft voltage is easy to damage the motor bearings. Therefore, a common improvement method is to ground the rotating shaft to reduce the shaft voltage.

In the field of design of motor grounding of inner rotor motors currently, a bearing is connected to ground through an outer stator for reducing the shaft voltage. As the rotor is a moving part, which is not easy to wire and conduct, existing rotor grounding structures generally require additional parts to achieve grounding. Thus, there are few designs to ground the rotor. However, the stator of the outer rotor motor is located at an inner side so that it is not easy to wire. Therefore, how to ground the outer rotor motor is a problem to be solved in the technical field of the present invention.

In view of the above drawbacks, the Inventor proposes the present invention based on his expert knowledge and elaborate research in order to solve the problems of prior art.

SUMMARY OF THE INVENTION

Accordingly, an object of the present invention is to provide a method of rotor grounding for a motor and a rotor-grounded motor.

The present invention provides a rotor-grounded motor including a stator, a rotor and a conductive plate. The stator is disposed with a bearing seat, and the bearing seat accommodates a bearing. The rotor includes a rotating shaft, and the rotating shaft is inserted in the bearing and electrically connected therewith. The conductive plate is disposed on the bearing seat, and one end of the conductive plate connects to the bearing and the other end electrically connects to a grounding terminal. The rotating shaft and the grounding terminal are electrically connected.

The stator is fastened with a screw rod, and the screw rod is connected to the conductive plate and electrically connected to the grounding terminal separately. One side of the stator is provided with a circuit board electrically connected thereof, and the screw rod is connected to the conductive plate and electrically connected to the circuit board separately.

The stator includes a silicon steel sheet and a plurality of silicon steel teeth arranged radially outside the silicon steel sheet. The conductive plate is configured in a ring shape and stacked on one end of the silicon steel sheet. An inner periphery of the conductive plate is extended with an overlapping foot, and the overlapping foot contacts the bearing so that the bearing is electrically connected to the conductive plate.

The present invention further provides a rotor-grounded motor including a stator, a rotor and a conductive plate. The stator is disposed with a bearing seat, and the bearing seat accommodates a bearing. The rotor includes a rotating shaft, and the rotating shaft is inserted in the bearing and electrically connected therewith. The conductive plate is disposed on the bearing seat, and one end of the conductive plate is connected to the bearing and the other end is electrically connected to a circuit board. The rotating shaft and the circuit board are electrically connected.

The stator is fastened with a screw rod, and the screw rod is connected to the conductive plate and electrically connected to the circuit board separately. The screw rod passes through the stator and the bearing seat. The circuit board is covered with a heat dissipation cover electrically connected to the circuit board, and the screw rod is fastened with the heat dissipation cover. The heat dissipation cover and the circuit board are connected with each other through a grounding pin.

The stator includes a silicon steel sheet and a plurality of silicon steel teeth arranged radially outside the silicon steel sheet. The conductive plate is configured in a ring shape and stacked on one end of the silicon steel sheet. An inner periphery of the conductive plate is extended with an overlapping foot, and the overlapping foot contacts the bearing so that the bearing is electrically connected to the conductive plate.

The present invention further provides a rotor-grounded motor including a stator and a rotor. The stator is provided with a bearing and a bearing seat. The bearing seat accommodates a conductive plate, and the conductive plate is electrically connected to the bearing. The rotor includes a rotating shaft, and the rotating shaft is inserted in the bearing to electrically connect therewith. The rotating shaft is electrically connected to a circuit board or a grounding terminal.

In the rotor-grounded motor and the method of rotor grounding therefor of the present invention, the conductive plate embedded in the bearing seat is electrically connected to the bearing and the ground separately so that the rotor is grounded. The rotor is grounded to improve the characteristic of full-band electromagnetic interference of the rotor-grounded motor. In the rotor-grounded motor and method of rotor grounding of the present invention, the bearing seat and the conductive plate are integrally formed without additional parts so as to reduce the complexity of manufacturing and working hours.

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, not being used to limit its executing scope. Any equivalent variation or modification made according to appended claims is all covered by the claims claimed by the present invention.

Please refer to FIG. 1 to FIG. 7, the present invention provides a rotor-grounded motor of a preferred embodiment including a stator 100, a rotor 200, a circuit board 300, and a conductive plate 150.

Figure 1:
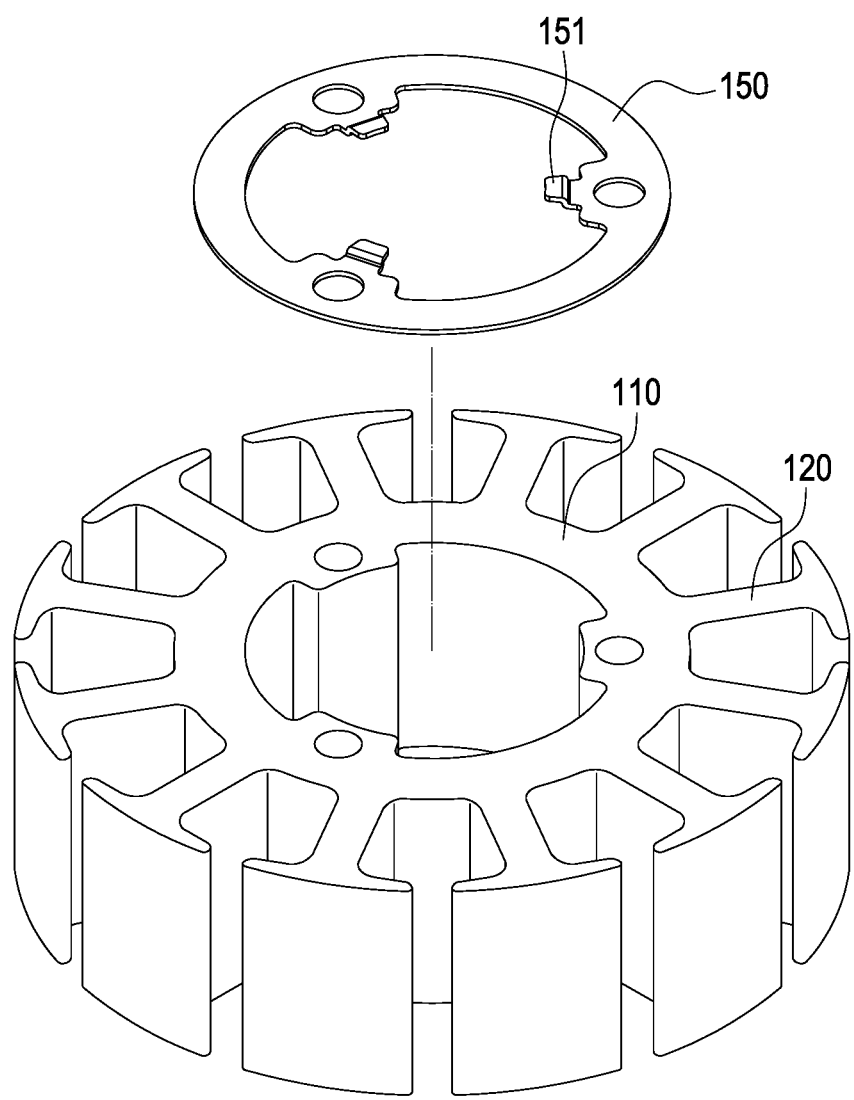
FIG. 1 to FIG. 3 are perspective explosion schematic views of stator of rotor-grounded motor of a preferred embodiment of the present invention.
Figure 2:
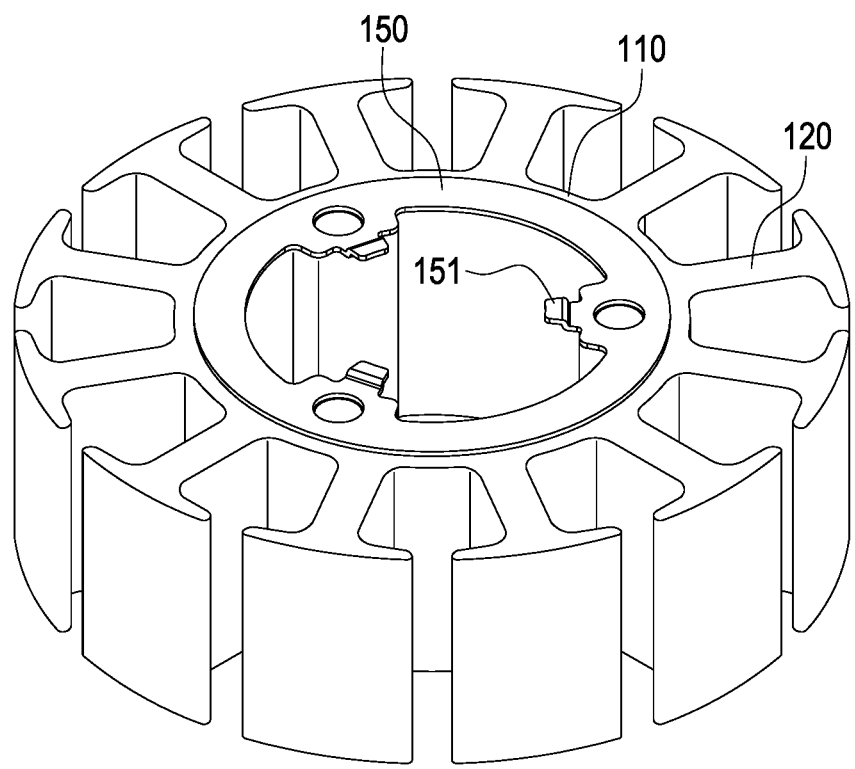
Figure 3:
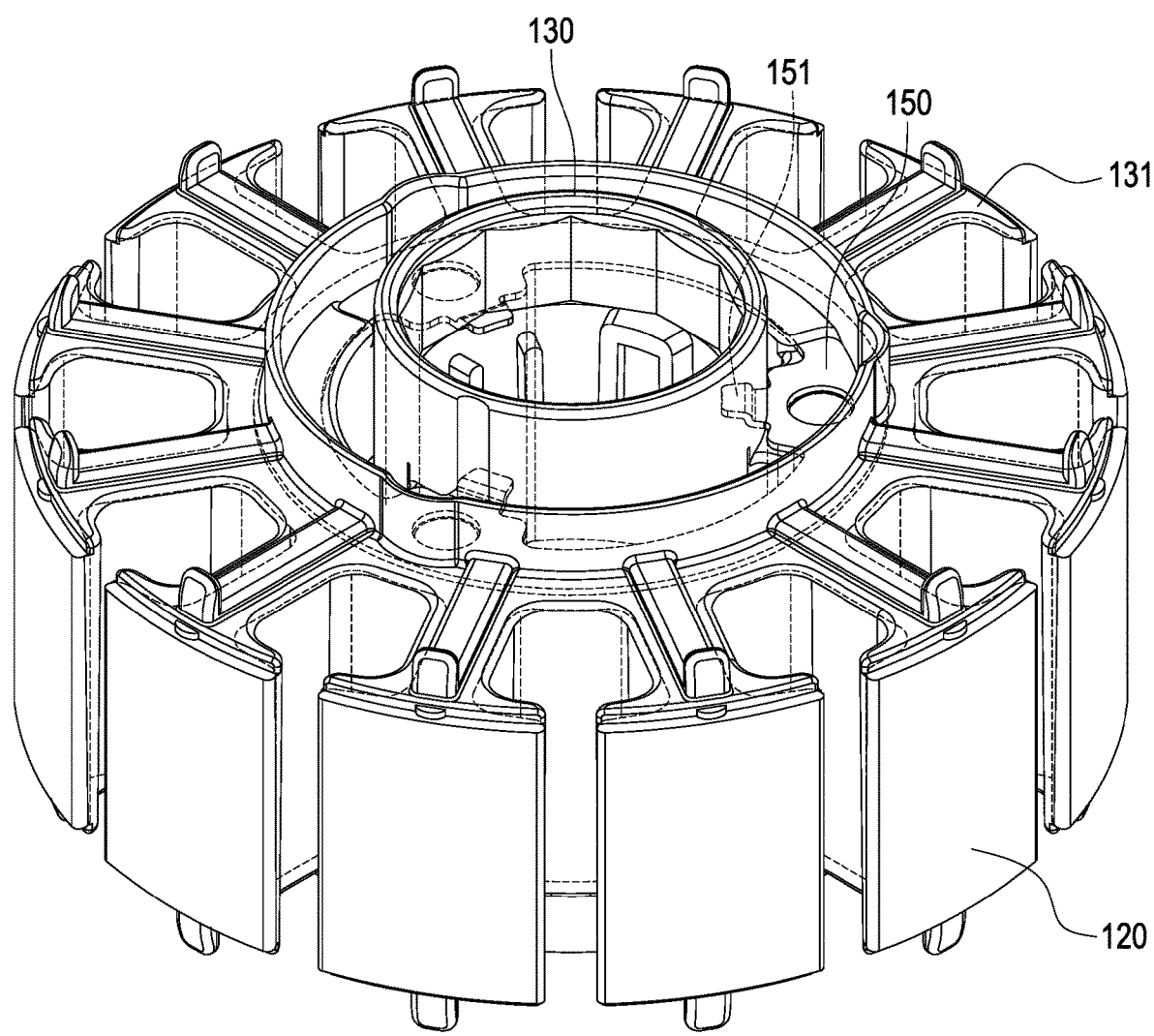
Figure 4:
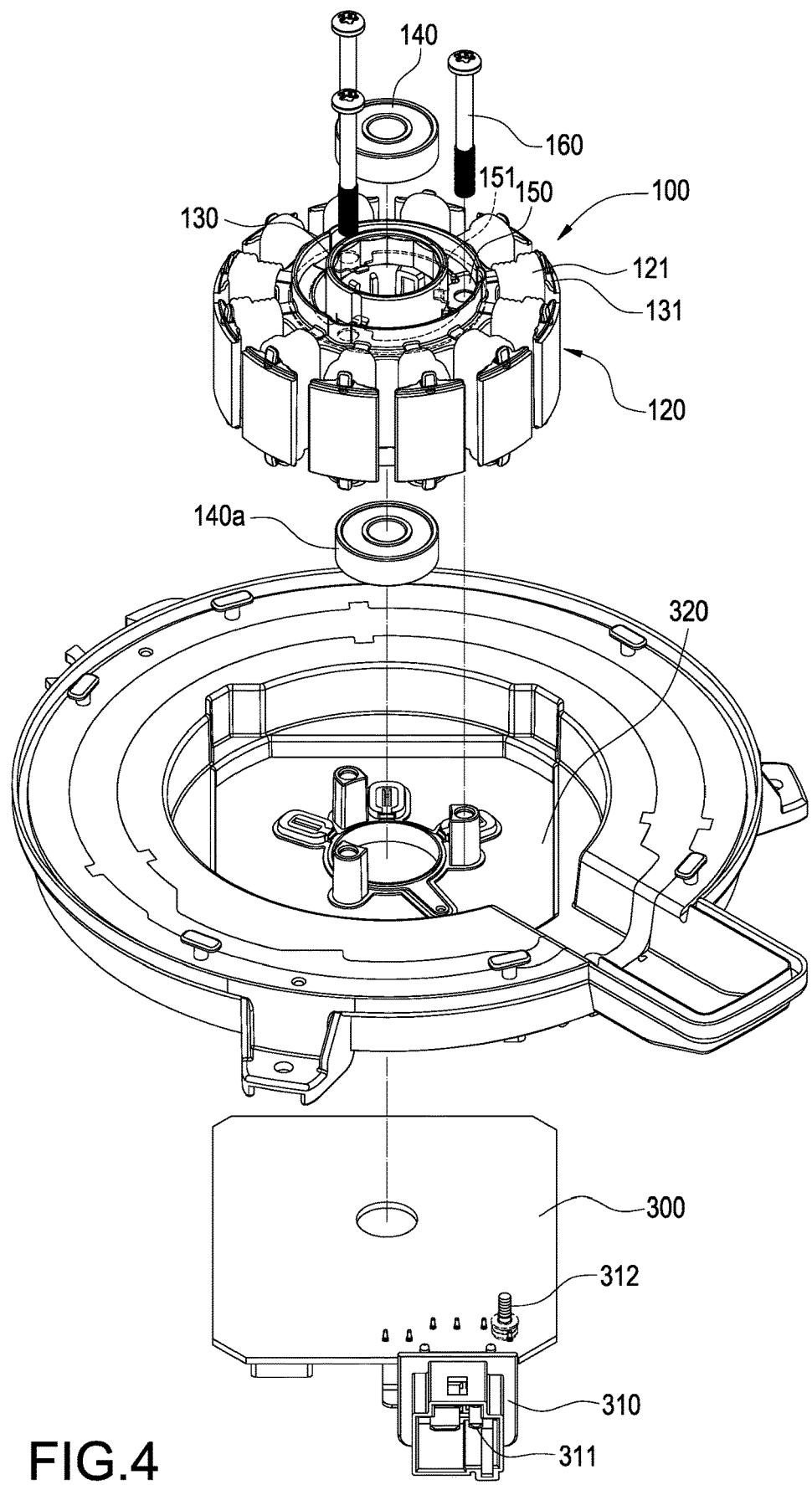
FIG. 4 and FIG. 5 are perspective explosion schematic views of rotor-grounded motor of a preferred embodiment of the present invention.

The rotor-grounded motor of the present invention has an external rotor 200. As shown in FIG. 1 and FIG. 2, the stator 100 includes a silicon steel sheet 110 and a plurality of silicon steel teeth 120 arranged radially outside the silicon steel sheet 110. As shown in FIG. 3, the stator 100 is disposed with a bearing seat 130. Specifically, the bearing seat 130 covers the silicon steel sheet 110 by injection molding. As shown in FIG. 3, the bearing seat 130 accommodates at least one bearing 140. In the present embodiment, the bearing 140 is fixed by the bearing seat 130. Furthermore, the bearing seat 130 of the present embodiment is preferably provided with a pair of bearings 140/140a. However, the quantity of bearings 140/140a is not limited in the present invention. As shown in FIG. 3, the bearing seat 130 further extends with an insulation shell 131 covering each of the silicon steel teeth 120 separately. As shown in FIG. 4, each silicon steel tooth 120 is provided for winding coils 121, and the coils 121 are insulated from the silicon steel teeth 120 by the insulation shell 131.

Figure 5:
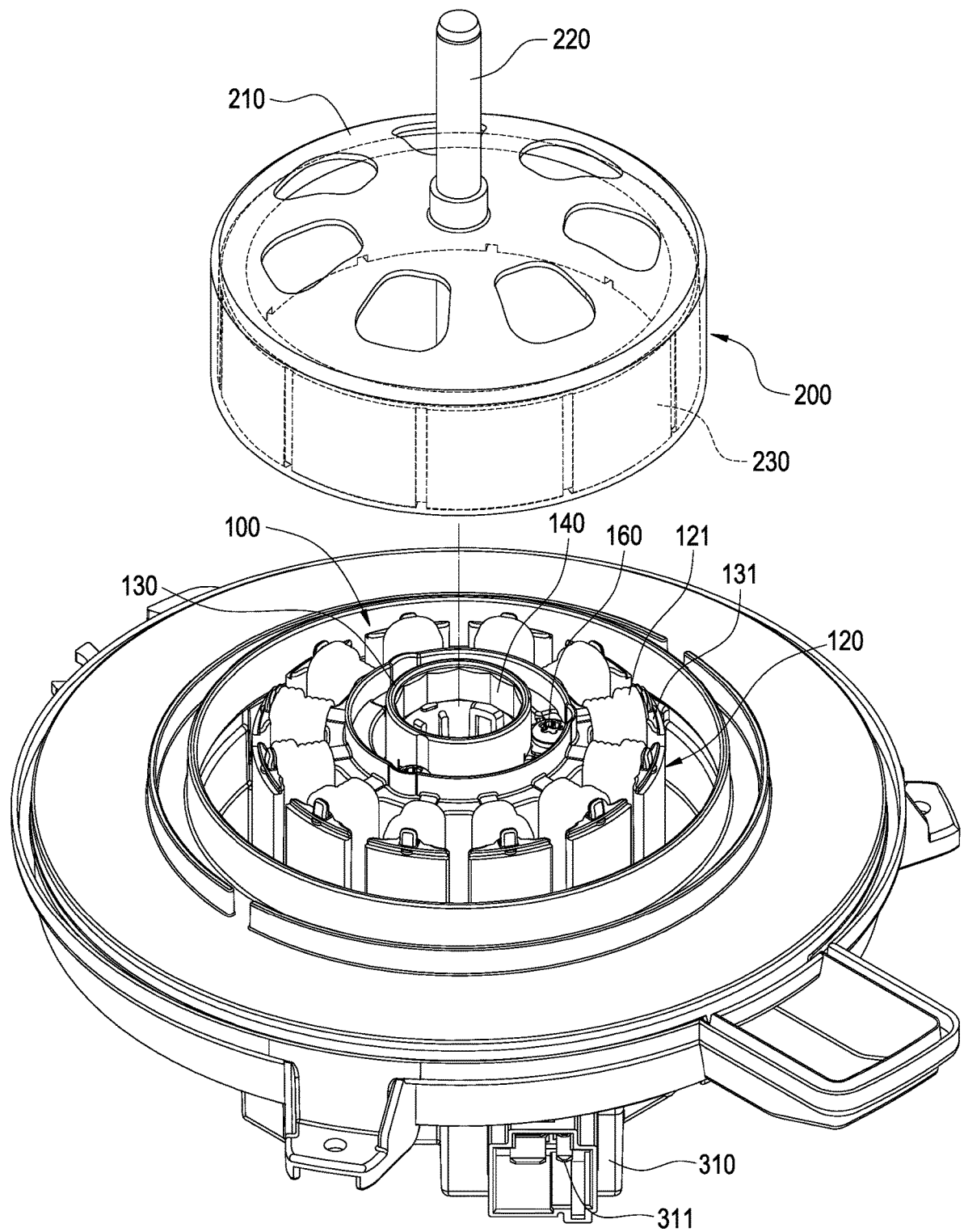
Figure 6:
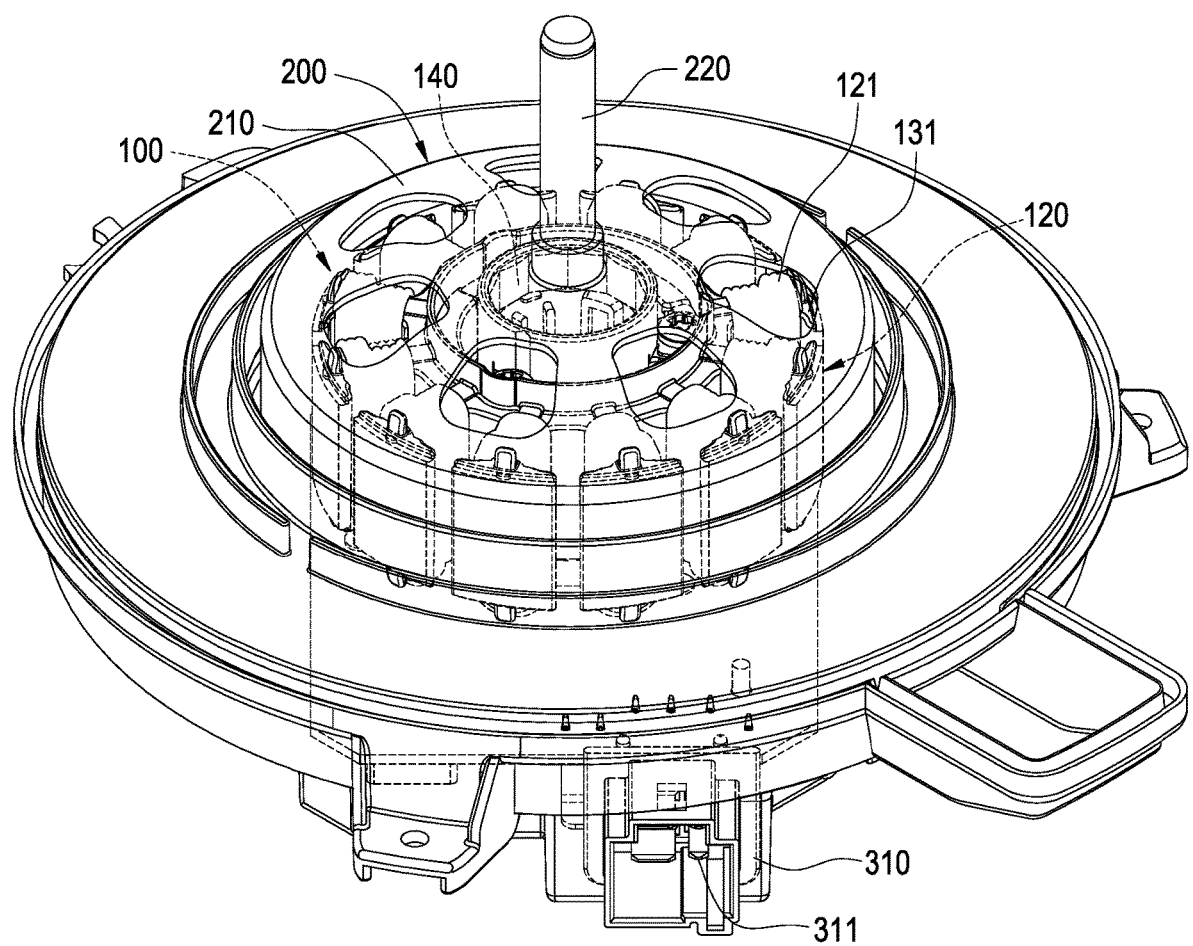
FIG. 6 is a perspective schematic view of rotor-grounded motor of a preferred embodiment of the present invention.

As shown in FIG. 5 and FIG. 6, the rotor 200 includes a case 210. The center of the case 210 is provided with a rotating shaft 220, and the inner wall of the case 210 is provided with a plurality of magnets 230. The case 210 of the rotor 200 covers the stator 100, and the rotating shaft 220 is inserted in the pair of bearings 140/140a and electrically connected to at least one of the bearings 140. In addition, the magnets 230 are arranged around the stator 100.

Please refer to FIG. 4 to FIG. 7 and FIG. 9 to FIG. 10. The circuit board 300 is disposed on one side of the stator 100. Specifically, the circuit board 300 is disposed corresponding with one end of the silicon steel sheet 110 of the stator 100 for electrically connecting with the coils 121 on each silicon steel tooth 120. The circuit board 300 is disposed with a connector 310 for power connection, and the connector 310 is provided with a grounding terminal 311 inside. When the connector 310 is connected to a power line, the grounding terminal 311 can be electrically connected to the ground point B through the power line. The coils 121 on each silicon steel tooth 120 are electrically connected to the circuit board 300 so that the circuit board 300 is electrically connected to the stator 100. Thereby, the circuit board 300 can control the input current of the coils 121.

Figure 7:
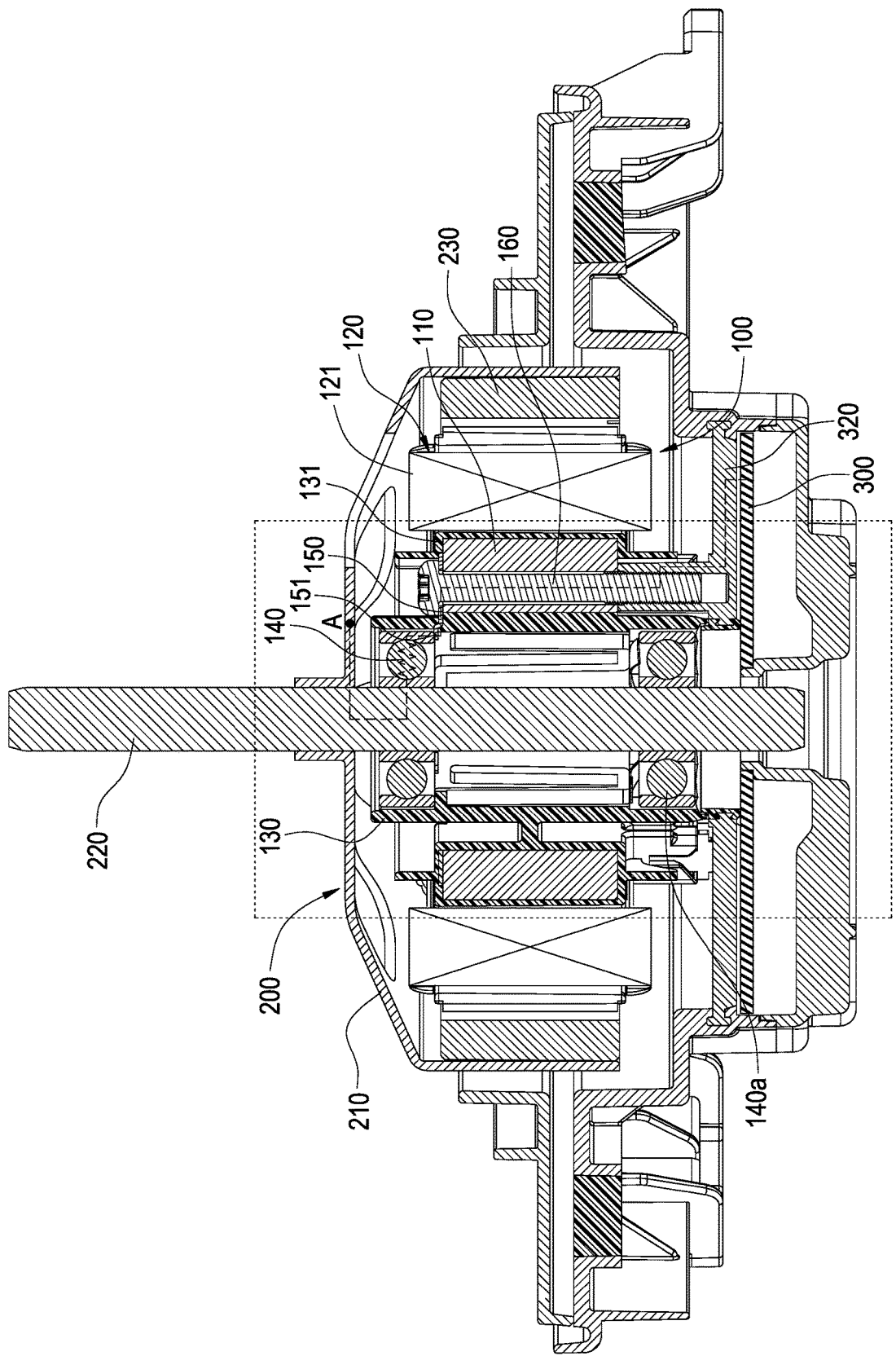
FIG. 7 is a cross sectional view of rotor-grounded motor of FIG. 6.
Figure 8:
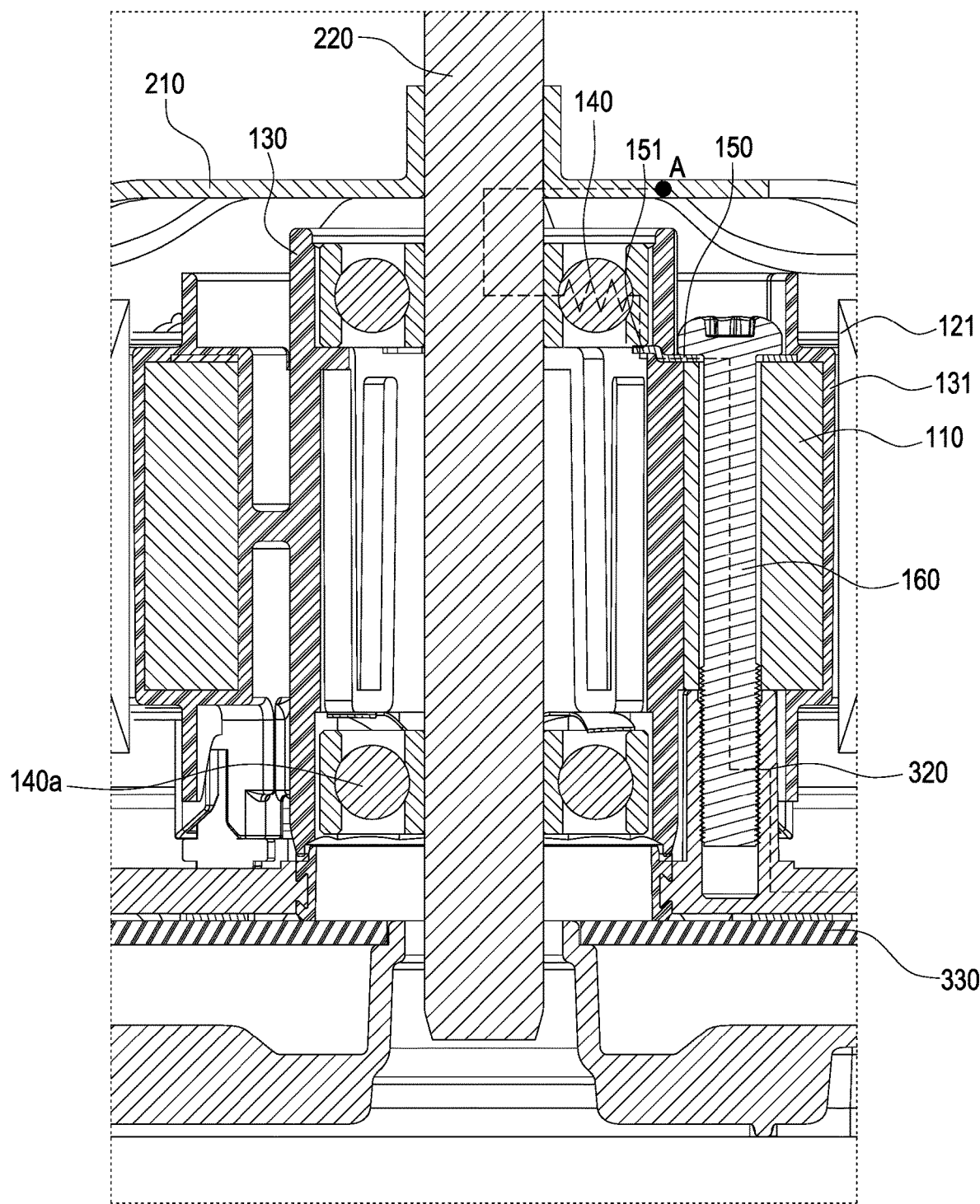
FIG. 8 is a partial enlargement view of FIG. 7.
Figure 9:
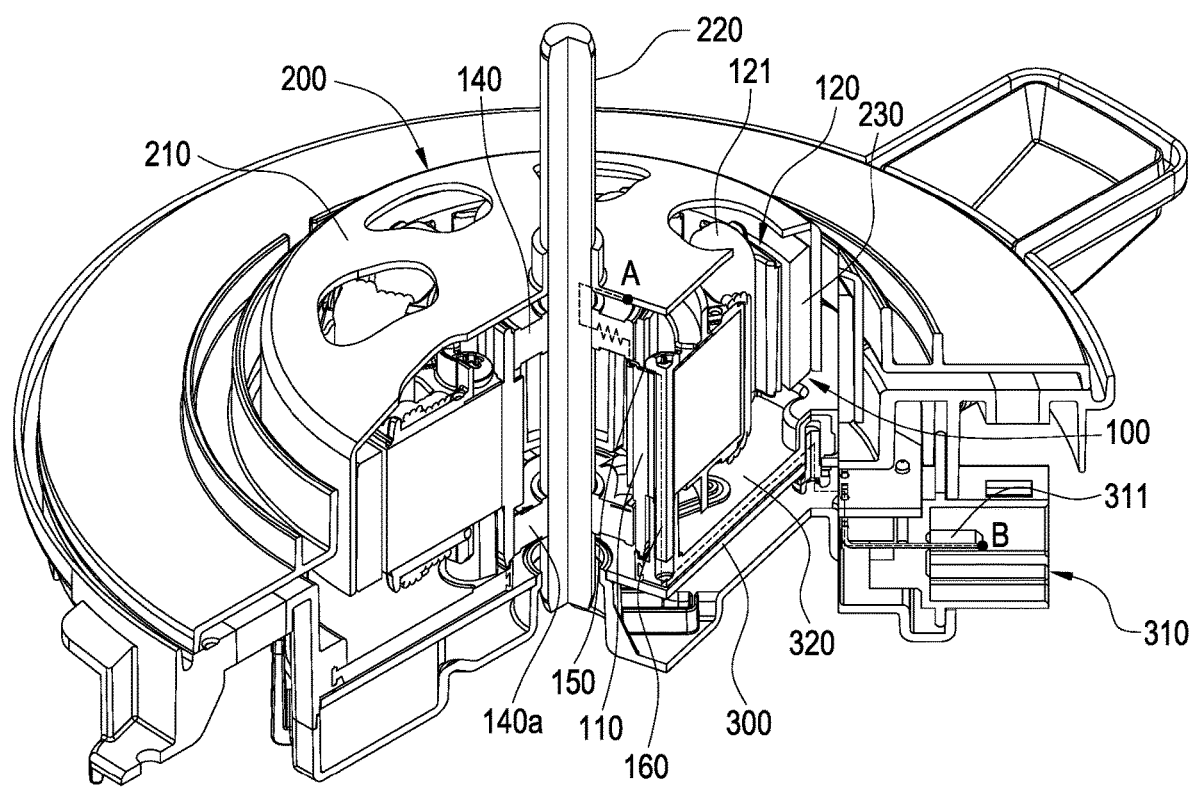
FIG. 9 is a perspective cutaway view of rotor-grounded motor of a preferred embodiment of the present invention.

As shown in FIG. 1 to FIG. 3, the conductive plate 150 is disposed in the bearing seat 130. In addition, as shown in FIG. 4, FIG. 7, and FIG. 8. One part of the conductive plate 150 is connected to any one of bearings 140, and another part of the conductive plate 150 is electrically connected to the grounding terminal 311 on the circuit board 300. Please refer to FIG. 4, FIG. 7, and FIG. 8. In the present embodiment, the conductive plate 150 is connected to the bearing 140 on the end of the silicon steel sheet 110 opposite to the circuit board 300. The specific electrical connection structure of the conductive plate 150 and the grounding terminal 311 is described as follows. The bearing seat 130 is fastened with a screw rod 160, and the screw rod 160 passes through the stator 100 along a longitudinal direction of the silicon steel sheet 11. One end of the screw rod 160 is connected to the conductive plate 150, and the screw rod 160 is electrically connected to the grounding terminal 311 on the circuit board 300. Please refer to FIG. 3 to FIG. 5, FIG. 7 and FIG. 8. Specifically, a part of the conductive plate 150 is exposed the bearing seat 130, and the portion of the screw rod 160 exposed the conductive plate 150 passes the conductive plate 150, and a nail head of the screw rod 160 is pressed against the conductive plate 150 to electrically connect with the conductive plate 150. Referring to FIG. 4, FIG. 7 and FIG. 8, the circuit board 300 is covered with a heat dissipation cover 320. The heat dissipation cover 320 and the circuit board 300 are connected with each other through a grounding pin 312, and the grounding pin 312 is electrically connected to the grounding terminal 311 through the circuits on the circuit board 300. The screw rod 160 is fastened with the heat dissipation cover 320 and electrically connected to the grounding terminal 311 on the circuit board 300 through the heat dissipation cover 320. In the present embodiment, the grounding pin 312 is preferably, but not limited to, a screw which fastens the heat dissipation cover 320 and the circuit board 300. In the present embodiment, the screw rod 160 passes through the stator 100 and fastens the heat dissipation cover 320 so that the heat dissipation cover 320 can be fastened with the stator 100. In the present embodiment, the heat dissipation cover 320 is fastened with the stator 100 preferably by three screw rods 160, but the quantity of the screw rods 160 is not limited in the present invention. The conductive path passes through the screw rod 160 closest to the grounding pin 312 from the conductive plate 150 and then passes the grounding pin 312 and the circuit board 300 to electrically connect to the grounding terminal 311. However, the connection method is not limited in aforementioned of the present invention. The conductive plate 150 can also be connected to the bearing 140a on the silicon steel sheet 110 corresponded with one end of the circuit board 300. This configuration makes the conductive sheet 150 adjacent to the circuit board 300 and can be directly connected to the circuit board 300 without passing through the screw rod 160.

Please further refer to FIG. 1 to FIG. 4. The specific method of disposition of the conductive plate 150 is described as follows. The conductive plate 150 is stacked on the stator 100. In the present embodiment, the conductive plate 150 is configured in a ring shape and is pre-stacked on the end of the silicon steel sheet 110 opposite to the circuit board 300 before the bearing seat 130 is formed. Then, the bearing seat 130 is formed so that the conductive plate 150 is embedded therein. The inner periphery of the conductive plate 150 is extended with an overlapping foot 151. The overlapping foot 151 protrudes the bearing seat 130 and contacts the upper bearing 140 so that the bearing 140 is electrically connected to the conductive plate 150.

Referring to FIG. 7 to FIG. 10, the rotor-grounded path A-B of the rotor-grounded motor of the present invention preferably starts from the case 210 of the rotor 200 and passes the rotating shaft 220, the bearing 140, the conductive plate 150, the screw rod 160, the heat dissipation cover 320, the circuit board 300, the connector 310 and connects to the grounding terminal 311 finally, wherein the grounding terminal 311 is a ground point so that the rotor 200 can be grounded; however, the invention is not limited to this. The screw rod 160 can be electrically connected to the circuit board 300 without passing the heat dissipation cover 320. The grounding point B is also not limited to the grounding terminal 311 but via other ground paths on the circuit board 300. In a simplest embodiment, the ground path A-B starts from the case 210 of the rotor 200 and at least electrically connects to the ground point B through the rotating shaft 220, the bearing 140, and the conductive plate 150.

Figure 10:
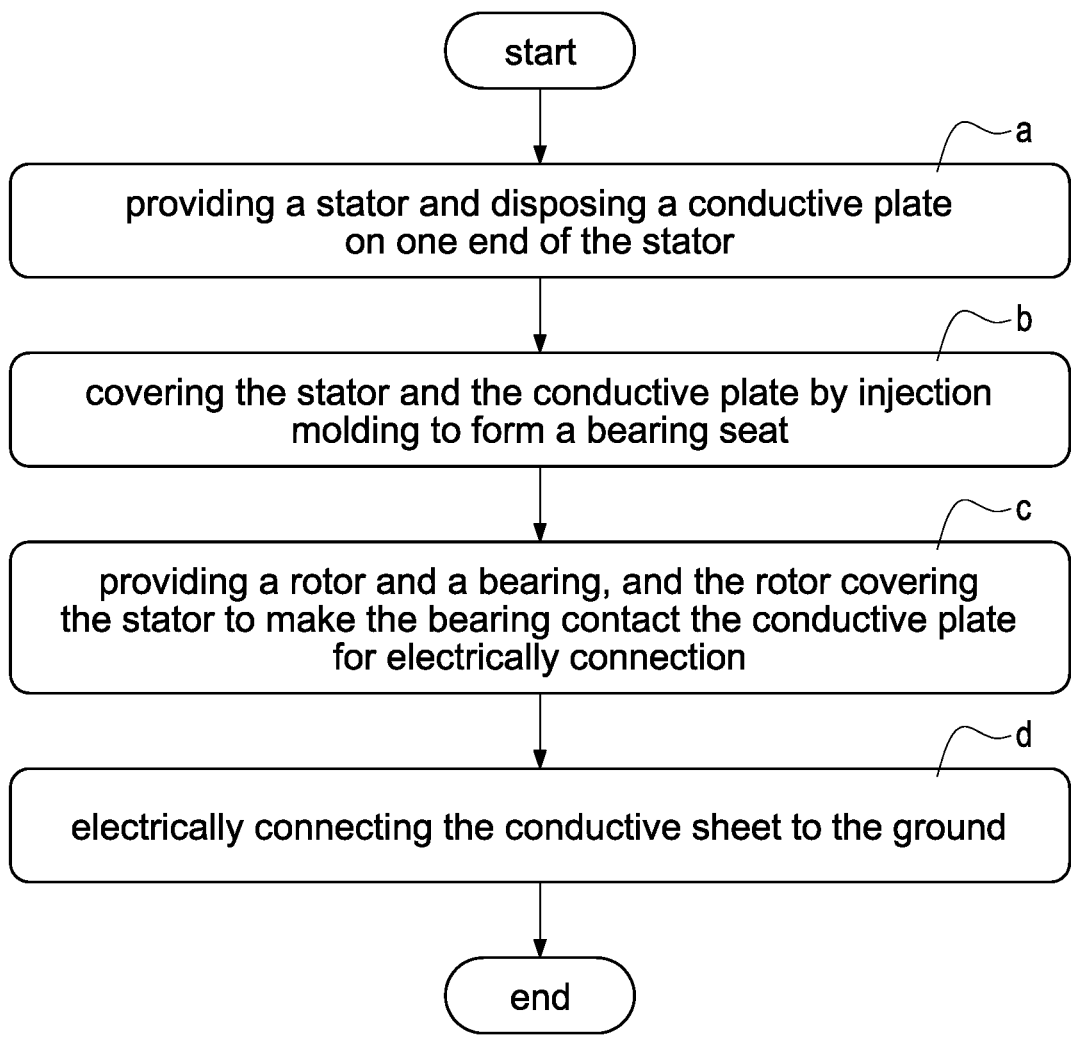
FIG. 10 is a flow chart of rotor-grounded method of rotor-grounded motor of a preferred embodiment of the present invention.

Referring to FIG. 10, the aforementioned rotor of the rotor-grounded motor in a preferred embodiment of the present invention has the grounding method including the following steps.

Please refer to FIG. 4, FIG. 5, and FIG. 9 to FIG. 10. Firstly, in step a, a stator 100 and a conductive plate 150 as shown in FIG. 4 and FIG. 5 are provided. The rotor 200 includes a rotating shaft 220, and the stator 100 is electrically connected to a ground point B. Specifically, one side of the stator 100 is provided with a circuit board 300 electrically connected thereof. The circuit board 300 electrically connects to an external power source and controls the input current of the stator 100, and the stator 100 is electrically connected to the ground point B through the circuit board 300.

Please refer to FIG. 1, FIG. 4, and FIG. 9 to FIG. 10. After step a and in step b, a bearing seat 130 is formed by injection molding on the stator 100 to embed the conductive plate 150 in the bearing seat 130 and electrically connect to the ground point B. As shown in FIG. 1 to FIG. 2, the stator 100 includes a silicon steel sheet 110 and a plurality of silicon steel teeth 120 arranged radially outside the silicon steel sheet 110. In this step, the conductive plate 150 is configured in a ring shape, and the conductive plate 150 is stacked on the other end of the silicon steel sheet 110 firstly in this step. Then, the bearing seat 130 is injection molded as shown in FIG. 3 to embed the conductive plate 150 therein. The circuit board 300 is disposed corresponding with one end of the silicon steel sheet 110 as shown in FIG. 4, whereby the conductive plate 150 and the circuit board 300 are disposed on opposite two sides of the stator 100. However, the present invention is not limited thereto, for example, the conductive plate 150 also can be stacked on one end of the silicon steel sheet 110 corresponding to the circuit board 300.

The structure of the conductive plate 150 electrically connected to the ground point B is described in detail as follows. The bearing seat 130 is fastened with a screw rod 160, and the screw rod 160 is connected to the conductive plate 150 and electrically connected to the grounding terminal 311 separately. The screw rod 160 passes the stator 100. The screw rod 160 is connected to the conductive plate 150 and electrically connected to the circuit board 300 separately. The circuit board 300 is covered with a heat dissipation cover 320, and the screw rod 160 is fastened with the heat dissipation cover 320. The heat dissipation cover 320 and the circuit board 300 are connected with each other through a grounding pin 312, and the grounding pin 312 is electrically connected to the grounding terminal 311 through the circuits on the circuit board 300. The screw rod 160 is fastened with the heat dissipation cover 320 and is electrically connected to the grounding terminal 311 on the circuit board 300 through the heat dissipation cover 320.

Please refer to FIG. 4 to FIG. 7 and FIG. 10. After step b and in step c, a rotor 200 and a bearing 140 as shown in FIG. 4 and FIG. 5 are provided. The bearing 140 is disposed in the bearing seat 130 so that the rotor 200 covers the stator 100 and connects to the conductive plate 150. In this step, after the bearing seat 130 is formed, the bearing 140 is inserted into the bearing seat 130 and accommodated in the silicon steel sheet 110. The inner periphery of the conductive plate 150 is extended with an overlapping foot 151, and the overlapping foot 151 contacts the bearing 140 so that the bearing 140 is electrically connected to the conductive plate 150.

After step c and in step d, the rotating shaft 220 is inserted in the bearing 140. The metal made rotating shaft 220 contacts the bearing 140 and is electrically connected therewith and further to electrically contact with the conductive plate 150 so that the rotor 200 can electrically connect to the ground point B through the conductive plate 150.

The rotor-grounded motor of the present invention can ground the rotor 200 through the conductive plate 150 embedded in the insulated bearing seat 130 to electrically connect to the bearing 140 and the ground point B separately. The grounding of rotor 200 can improve the characteristic of full-band electromagnetic interference of the rotor-grounded motor. The bearing seat 130 and the conductive plate 150 of the rotor-grounded motor of the present invention are integrally formed without additional parts so as to reduce the complexity of manufacturing and working hours.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A rotor-grounded motor, comprising:
   a stator disposed with a bearing seat, and the bearing seat accommodating a bearing;
   a rotor including a rotating shaft, and the rotating shaft inserted in the bearing and electrically connected therewith; and
   a conductive plate disposed on the bearing seat, and one end of the conductive plate connected to the bearing and the other end electrically connected to a grounding terminal;
   wherein, the rotating shaft and the grounding terminal are electrically connected,
   wherein the stator includes a silicon steel sheet and a plurality of silicon steel teeth arranged radially outside the silicon steel sheet; and the conductive plate is configured as airing and stacked on one end of the silicon steel sheet;
   wherein the stator is fastened with a screw rod, and the screw rod is connected with the conductive plate and electrically connected with the circuit board separately;
   wherein the circuit board is covered with a heat dissipation cover electrically connected to the circuit board, and the screw rod is fastened with the heat dissipation cover.

2. The rotor-grounded motor according to claim 1, wherein the stator is fastened with a screw rod, and the screw rod is connected with the conductive plate and electrically connected to the grounding terminal separately.

3. The rotor-grounded motor according to claim 2, wherein one side of the stator is provided with a circuit board electrically connected thereof, and the screw rod is connected with the conductive plate and electrically connected to the circuit board separately.

4. The rotor-grounded motor according to claim 1, wherein an inner periphery of the conductive plate is extended with an overlapping foot, and the overlapping foot is connected with the bearing so that the bearing is electrically connected to the conductive plate.

5. A rotor-grounded motor, including:
- a stator disposed with a bearing seat, and the bearing seat accommodating a bearing;
- a rotor including a rotating shaft, and the rotating shaft inserted in the bearing to electrically connect therewith; and
- a conductive plate disposed in the bearing seat, and one end of the conductive plate connected to the bearing and the other end electrically connected to a circuit board;
- wherein the rotating shaft and the circuit board are electrically connected,
- wherein the stator includes 8 silicon steel sheet and a plurality of silicon steel teeth arranged radially outside the silicon steel sheet and the conductive plate is configured as a ring and slacked on one end of the silicon steel sheet;
- wherein the stator is fastened with a screw rod, and the screw rod is connected with the conductive plate and electrically connected with the circuit board separately;
- wherein the circuit board is covered with a heat dissipation cover electrically connected to the circuit board, and the screw rod is fastened with the heat dissipation cover.

6. The rotor-grounded motor according to claim 5, wherein the screw rod passes through the stator and the bearing seat.

7. The rotor-grounded motor according to claim 5, wherein the heat dissipation cover and the circuit board are connected with each other through a grounding pin.

8. The rotor-grounded motor according to claim 5, wherein an inner periphery of the conductive plate is extended with an overlapping foot, and the overlapping foot is connected with the bearing so that the bearing is electrically connected to the conductive plate.

9. A rotor-grounded motor, including:
- a stator provided with a bearing and a bearing seat, wherein the bearing seat accommodates a conductive plate, and the conductive plate is connected with the bearing; and
- a rotor including a rotating shaft, and the rotating shaft inserted in the bearing to electrically connect therewith,
- wherein the rotating shaft is electrically connected to a circuit board or a grounding terminal,
- wherein the stator includes a silicon steel sheet and a plurality of silicon steel teeth arranged radially outside the silicon steel sheet and the conductive plate is configured as airing and stacked on one end of the silicon steel sheet;
- wherein the stator is fastened with a screw rod, and the screw rod is connected with the conductive plate and electrically connected with the circuit board separately;
- wherein the circuit board is covered with a heat dissipation cover electrically connected to the circuit board, and the screw rod is fastened with the heat dissipation cover.

* * * * *